US012730509B2

(12) United States Patent
Berkovich et al.

(10) Patent No.: US 12,730,509 B2
(45) **Date of Patent: *Sep. 8, 2026**

(54) SENSING ACTIVATION MAPS FROM EYE DATA

(71) Applicant: Meta Platforms Technologies, LLC, Menlo Park, CA (US)

(72) Inventors: Andrew Samuel Berkovich, Sammamish, WA (US); Reid Frederick Pinkham, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,042

(22) Filed: Sep. 17, 2024

(65) Prior Publication Data

US 2025/0013300 A1 Jan. 9, 2025

Related U.S. Application Data

(63) Continuation of application No. 17/954,583, filed on Sep. 28, 2022, now Pat. No. 12,124,623.

(60) Provisional application No. 63/357,564, filed on Jun. 30, 2022.

(51) Int. Cl.
*G06F 3/01* (2006.01)
*G06T 19/00* (2011.01)

(52) U.S. Cl.
CPC ............ *G06F 3/013* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,252,989 | B1 | 6/2001 | Geisler et al. |
| 6,839,452 | B1 | 1/2005 | Yang et al. |
| 7,525,586 | B2 | 4/2009 | Loose |
| 10,091,441 | B1 | 10/2018 | Northcott |
| 10,572,764 | B1 | 2/2020 | Bastani et al. |
| 10,867,368 | B1 | 12/2020 | Sharma et al. |
| 11,379,952 | B1 | 7/2022 | Sharma et al. |
| 2007/0248273 | A1 | 10/2007 | Kortum et al. |
| 2009/0010555 | A1 | 1/2009 | Kortum et al. |
| 2015/0077613 | A1 | 3/2015 | Petilli |
| 2019/0363118 | A1 | 11/2019 | Berkovich et al. |
| 2020/0045250 | A1 | 2/2020 | Geurts |
| 2020/0143516 | A1 | 5/2020 | Martin et al. |
| 2020/0195828 | A1 | 6/2020 | Reyserhove et al. |
| 2020/0195875 | A1 | 6/2020 | Berkovich et al. |
| 2021/0044742 | A1 | 2/2021 | Berkovich et al. |
| 2021/0112427 | A1 | 4/2021 | Shveki et al. |
| 2021/0368124 | A1 | 11/2021 | Berkovich et al. |

(Continued)

OTHER PUBLICATIONS

Non-Final Office Action mailed Feb. 15, 2024 for U.S. Appl. No. 17/954,583, filed Sep. 28, 2022, 8 pages.

(Continued)

*Primary Examiner* — Nicholas J Lee
(74) *Attorney, Agent, or Firm* — FREESTONE INTELLECTUAL PROPERTY LAW PLLC; Aaron J. Visbeek

(57) ABSTRACT

Eye gaze data is generated by an eye-tracking module. One or more activation maps are generated by a sensing module based on the eye gaze data. The sensing module acquires sensor data based on the one or more activation maps.

20 Claims, 9 Drawing Sheets

(56) References Cited

U.S. PATENT DOCUMENTS

| | | | |
|---|---|---|---|
| 2022/0139034 | A1 | 5/2022 | Lovegrove et al. |
| 2024/0007771 | A1 | 1/2024 | Berkovich et al. |

OTHER PUBLICATIONS

Notice of Allowance mailed Jun. 17, 2024 for U.S. Appl. No. 17/954,583, filed Sep. 28, 2022, 9 pages.

Patney A., et al., "Towards Foveated Rendering for Gaze-Tracked Virtual Reality," Association for Computing Machinery Transactions on Graphics, Nov. 2016, vol. 35 (6), Article 179, 12 pages.

Qualcomm., "Qualcomm Introduces Snapdragon 835 Virtual Reality Development Kit," Feb. 23, 2017, 2 pages, Retrieved from the Internet: URL: https://www.qualcomm.com/news/releases/2017/02/qualcomm-introduces-snapdragon-835-virtual-reality-development-kit.

1 Notice of Allowance, U.S. Appl. No. 18/208,236, Notification Date: Jul. 8, 2025, 8 pages.

SENSING ACTIVATION MAPS FROM EYE DATA

CROSS-REFERENCE TO RELATED APPLICATIONS

This application is a Continuation of pending U.S. Non-Provisional application Ser. No. 17/954,583, filed Sep. 28, 2022, which claims the benefit of U.S. Provisional Application No. 63/357,564 filed Jun. 30, 2022. U.S. Non-Provisional application Ser. No. 17/954,583, and U.S. Provisional Application No. 63/357,564 are expressly incorporated herein by reference in their entirety.

BACKGROUND INFORMATION

Field of the Various Embodiments

Embodiments of this disclosure relate generally to computer vision systems and, more specifically, to techniques for gaze-contingent sensing and processing.

Description of the Related Art

Artificial reality systems display content that may include generated content exclusively or generated content combined with captured (e.g., real-world) content. Conventional artificial reality systems generally capture and process real-world content uniformly, regardless of where a user is looking.

One drawback of capturing and processing real-world content uniformly is that, when high-resolution content is desired, imaging sensors require a significant amount of time and consume a significant amount of power to digitize the high-resolution image data being captured. Given the computational complexity of processing high-resolution image data, a significant amount of time is also required to process the captured image data. The time and power consumption required to capture and process real-world content uniformly makes such content infeasible for use in certain applications. For example, real-time applications that are power constrained oftentimes cannot make use of uniformly captured real-world content.

As the foregoing illustrates, what is needed in the art are more effective techniques for capturing and processing sensor data.

SUMMARY

One embodiment of the present disclosure sets forth a computer-implemented method for acquiring sensor data. The method includes determining, based on first sensor data, an eye gaze direction associated with an eye viewing a scene. The method further includes generating, based on the eye gaze direction, an activation map that includes a plurality of regions, where the activation map specifies, for each of the plurality of regions, a corresponding sampling density. In addition, the method includes acquiring, via at least one sensor, second sensor data based on the sampling densities corresponding to the plurality of regions and specified by the activation map.

Another embodiment of the present disclosure sets forth a computer-implemented method for processing sensor data. The method includes sub-sampling or binning, based on an eye gaze direction associated with an eye viewing a scene, first sensor data in a plurality of regions at a plurality of ratios to generate a plurality of sub-sampled or binned data. The method further includes processing each sub-sampled or binned data included in the plurality of sub-sampled or binned data to generate corresponding intermediate processed data. In addition, the method includes combining the intermediate processed data generated for each sub-sampled or binned data included in the plurality of sub-sampled or binned data to generate processed data for display to a user.

Other embodiments of the present disclosure include, without limitation, a computer-readable medium including instructions for performing one or more aspects of the disclosed techniques as well as a computing device for performing one or more aspects of the disclosed techniques.

One advantage of the disclosed techniques is that real-world content at locations that the eye gaze of a user is not focused can be captured at lower resolutions relative to real-world content at locations that the eye gaze is focused, which reduces the time required to digitize sensor data and the power consumption of sensor devices that acquire sensor data. In addition, a processing pipeline is disclosed that processes captured real-world content in a computationally efficient manner by reducing the number of pixels that are processed via sub-sampling (or binning) in regions corresponding to locations that the eye gaze is not focused. Among other things, the disclosed techniques permit applications that are speed, power, and/or latency sensitive to effectively capture and process real-world content. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

In the following description, numerous specific details are set forth to provide a more thorough understanding of the various embodiments. However, it is apparent to one of skill in the art that the disclosed concepts may be practiced without one or more of these specific details.

Configuration Overview

One or more embodiments disclosed herein relate to computer vision systems. In some embodiments, one or more activation maps are generated based on eye gaze data and used to control operation of one or more sensors. Each activation map indicates a highest density for acquiring sensor data in a region corresponding to an eye gaze direction and lower densities for acquiring sensor data in other regions. After the sensor data is acquired, a processing pipeline sub-samples (or bins) and processes regions of the acquired sensor data at different ratios based on the eye gaze direction. The sub-sampled (or binned) data for each region is processed independently, and results of the processing are combined to generate processed data, such as an image that can be displayed to a user.

Embodiments of the disclosure may also include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

System Overview

Figure 1A:
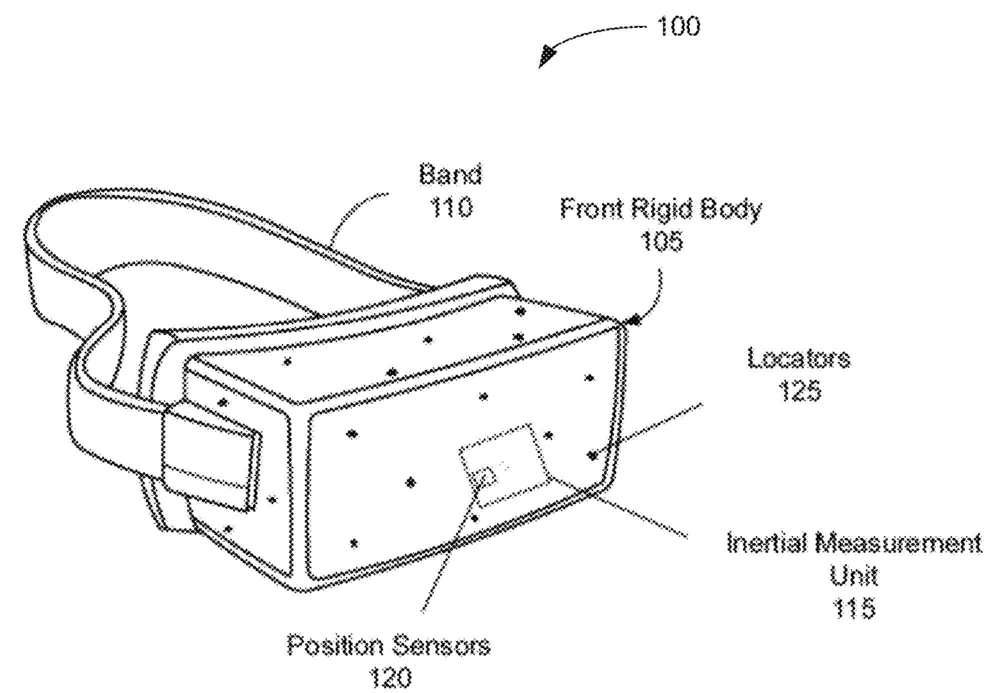
FIG. 1A is a diagram of a near eye display (NED), according to various embodiments.

FIG. 1A is a wire diagram of a near eye display (NED) 100, according to various embodiments. Although NEDs and head mounted displays (HMDs) are disclosed herein as reference examples, the display elements and display devices that are disclosed herein can also be configured for placement in proximity of an eye or eyes of the user at a fixed location, without being head-mounted (e.g., the display device may be mounted in a vehicle, such as a car or an airplane, for placement in front of an eye or eyes of the user).

As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an AR or MR device, portions of the NED 100 and/or its internal components are at least partially transparent.

Figure 1B:
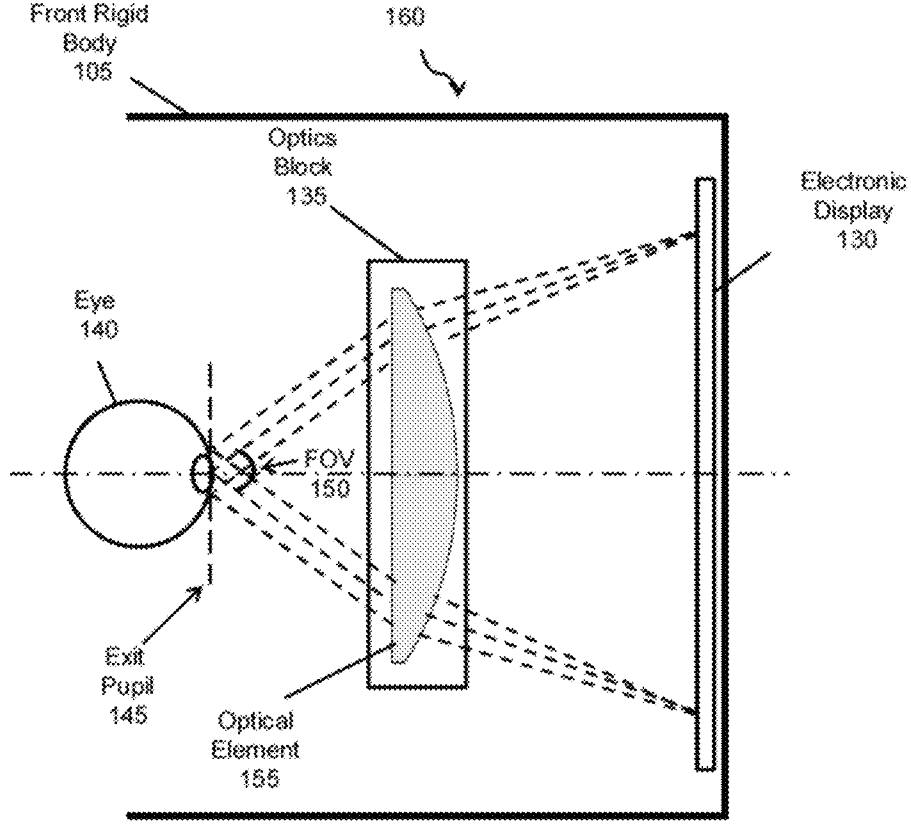
FIG. 1B is a cross section of the front rigid body of the embodiments of the NED illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B illustrates a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMOLED), a QOLED, a QLED, some other display, or some combination thereof. In some embodiments, the electronic display 130 can include one or more of the light emission display elements and devices discussed in detail below in conjunction with FIGS. 4-18.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a PBP lens or grating, a color-selective filter, a waveplate, a C-plate, a spatial light modulator, or any other suitable optical element 155 that affects the image light. Moreover, the optics block 135 may include combinations of different optical elements. One or more of the optical elements in the optics block 135 may have one or more coatings, such as anti-reflective coatings. In some embodiments, the optics block 135 may include one or more of the optical patterning systems discussed in detail below in conjunction with FIGS. 4-14.

Figure 2A:
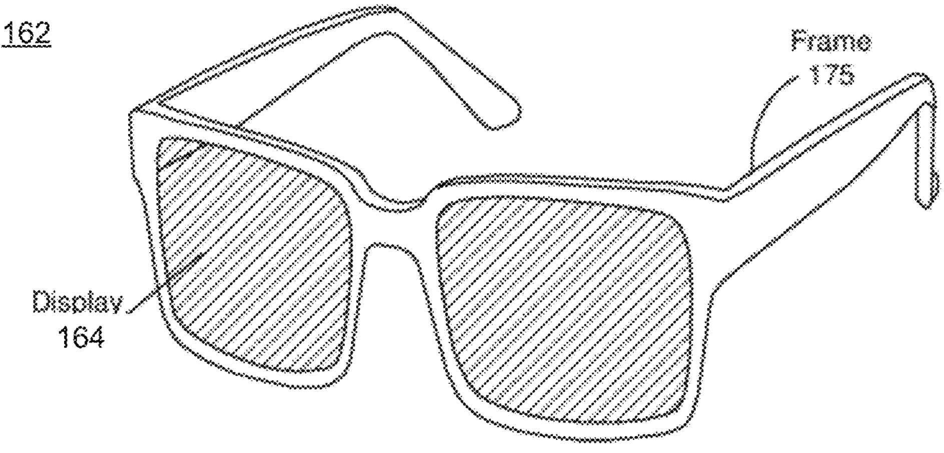
FIG. 2A is a diagram of a head-mounted display (HMD) implemented as a NED, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a virtual reality (VR) HMD, a mixed reality (MR) HMD, or some combination thereof. The HMD 162 includes a frame 175 and a display 164. As shown, the frame 175 mounts the near eye display to the user's head, while the display 164 provides image light to the user. The display 164 may be customized to a variety of shapes and sizes to conform to different styles of eyeglass frames.

Figure 2B:
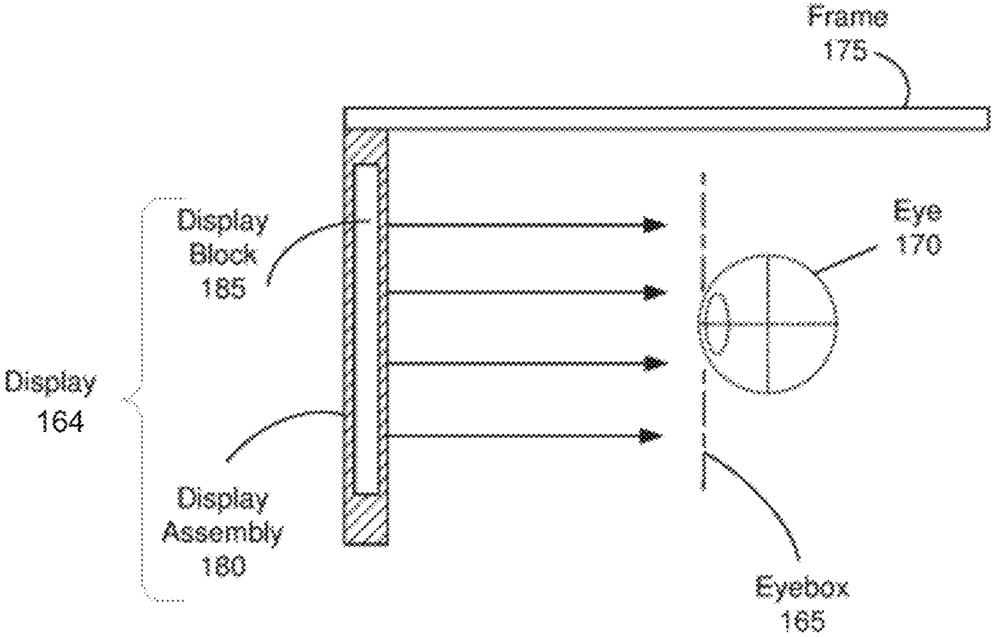
FIG. 2B is a cross-section view of the HMD of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from a computer generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may also comprise one or more materials (e.g., plastic, glass, etc.) with one or more refractive indices that effectively minimize the weight and widen a field of view of the HMD 162.

Figure 3:
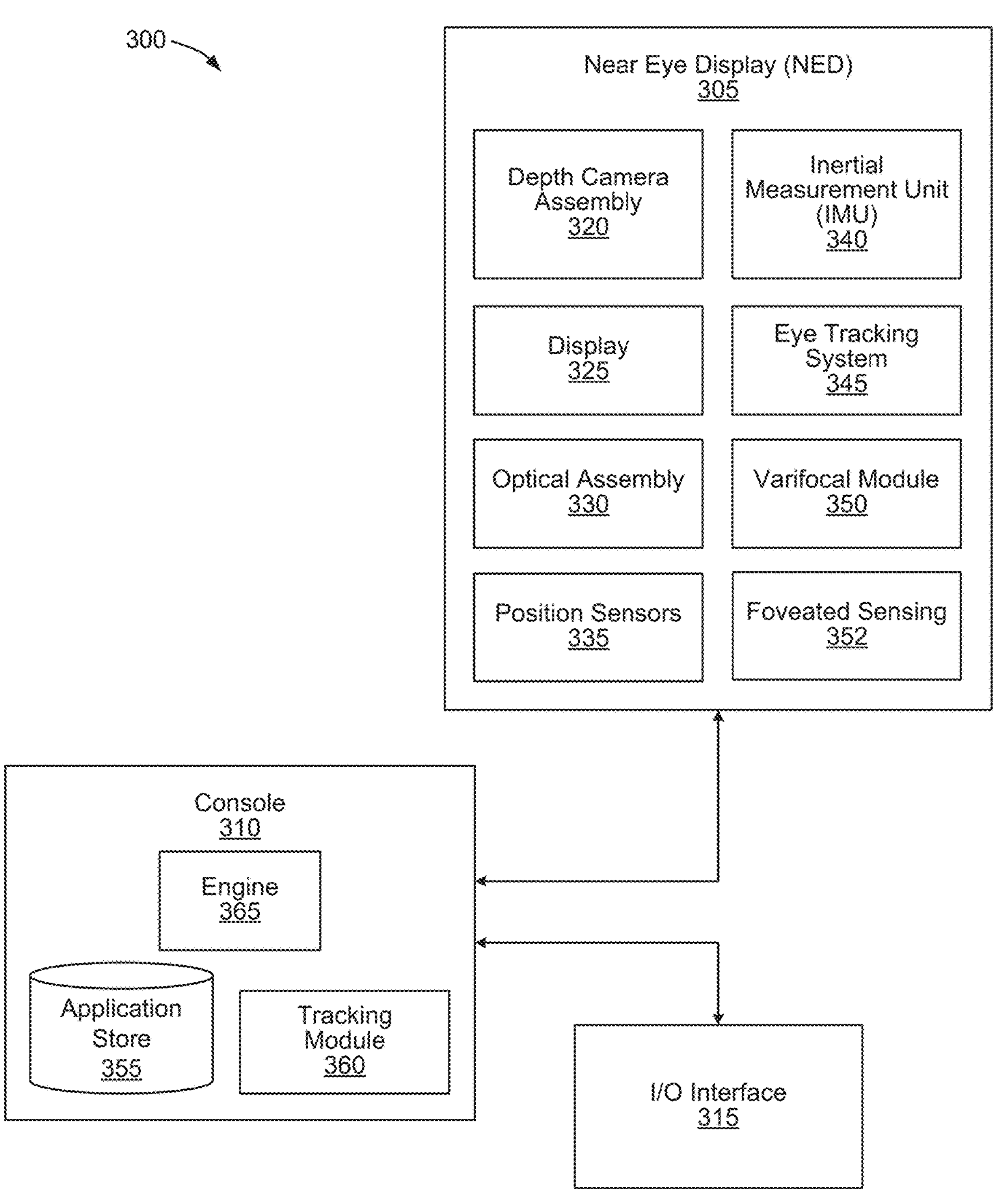
FIG. 3 is a block diagram of a NED system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a virtual reality (VR) system environment, an augmented reality (AR) system environment, a mixed reality (MR) system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, a varifocal module 350, and a foveated sensing module 352. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth. The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VC- SEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 passes through various optical elements of the optical assembly 330. In some embodiments, optical elements of the optical assembly 330 are integrated into the display 325 as a projection assembly that includes at least one waveguide coupled with one or more optical elements.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrates the velocity vector over time to determine an estimated current position of a reference point on the NED 305. Alternatively, the IMU 340 provides the sampled measurement signals to the console 310, which analyzes the sample data to determine one or more measurement errors. The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305. Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze.

In some embodiments, the foveated sensing module 352 generates, based on eye gaze data, activation maps that control the sampling densities at which one or more outward facing sensors of the NED 305 acquire sensor data in different regions, as described in greater detail below in conjunction with FIGS. 4-5 and 9.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving the action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine references positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

In some embodiments, based on the eye tracking information (e.g., orientation of the user's eye) received from the eye tracking system 345, the engine 365 determines a resolution of the media content provided to the NED 305 for presentation to the user on the display 325. The engine 365 may adjust a resolution of the visual content provided to the NED 305 by configuring the display 325 to perform foveated rendering of the visual content, based at least in part on a direction of the user's gaze received from the eye tracking system 345. The engine 365 provides the content to the NED 305 having a high resolution on the display 325 in a foveal region of the user's gaze and a low resolution in other regions, thereby reducing the power consumption of the NED 305. In addition, using foveated rendering reduces a number of computing cycles used in rendering visual content without compromising the quality of the user's visual experience. In some embodiments, the engine 365 can further use the eye tracking information to adjust a focus of the image light emitted from the display 325 in order to reduce vergence-accommodation conflicts.

Gaze-Contingent Sensing and Processing

Figure 4:
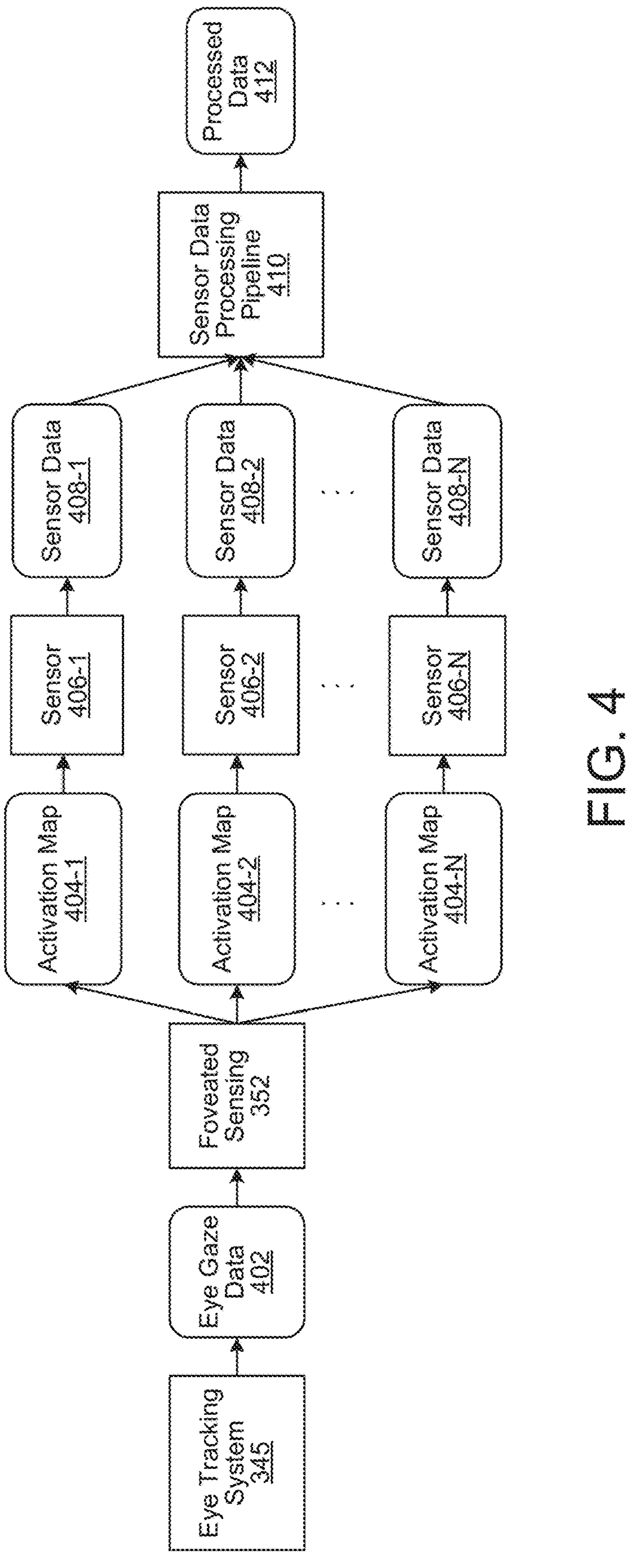
FIG. 4 illustrates a technique for acquiring and processing sensor data based on eye gaze, according to various embodiments.

FIG. 4 illustrates a technique for acquiring and processing sensor data based on eye gaze, according to various embodiments. As shown, the eye tracking system 345 generates eye gaze data 402 that is input into the foveated sensing module 352. Using the eye gaze data 402, the foveated sensing module 352 generates an activation map 404-1 to 404-N (referred to herein collectively as activation maps 404 and individually as an activation map 404) for each sensor 406-1 to 406-N (referred to herein collectively as sensors 406 and individually as sensor 406) that faces outward (i.e., facing away from a user). Different activation maps 404 are required when the sensors 406 have different fields of view. Any technically feasible sensors 406 can be used in some embodiments, such as monochrome image sensors, color image sensors, depth sensors, time-of-flight (ToF) sensors, a combination thereof, etc. For example, the sensors 406 could include a stereo pair of image sensors, a vertical-cavity surface-emitting laser (VCSEL) or other type of depth sensor, etc. As another example, the sensors 406 could include one or more rolling shutter and/or global shutter sensors. In some embodiments, the sensor 406 can include one or more sensors of the DCA 320, described above in conjunction with FIG. 3.

Each activation map 404 indicates sampling densities for acquiring sensor data in different regions. For a given region, the sampling density controls a sparse amount of sensor data that is acquired for that region by the sensor 406 corresponding to the activation map 404. Acquiring sensor data can include digitizing data, which involves quantizing and reading out the data, and oftentimes requires a significant amount of time and power. The activation maps 404 reduce the amount of sensor data acquired by corresponding sensors 406 for regions of the activation map 404 that are associated with lower sampling densities. In some embodiments, the region of each activation map 404 that is associated with a highest sampling density corresponds to an eye gaze direction where the fovea of an eye of a user is pointed, and other regions of the activation map 404 correspond to other directions where the fovea is not pointed. As a general matter, the user will be most sensitive to image noise and artifacts in the eye gaze direction where the fovea is pointed, and sensitivity to noise and artifacts falls off as the distance from the eye gaze direction increases in peripheral regions. Accordingly, the activation maps 404 can be used to focus sensor resources to mimic the visual acuity of a user by acquiring more sensor data for regions that the user is more likely to notice noise and artifacts, and vice versa.

Figure 5:
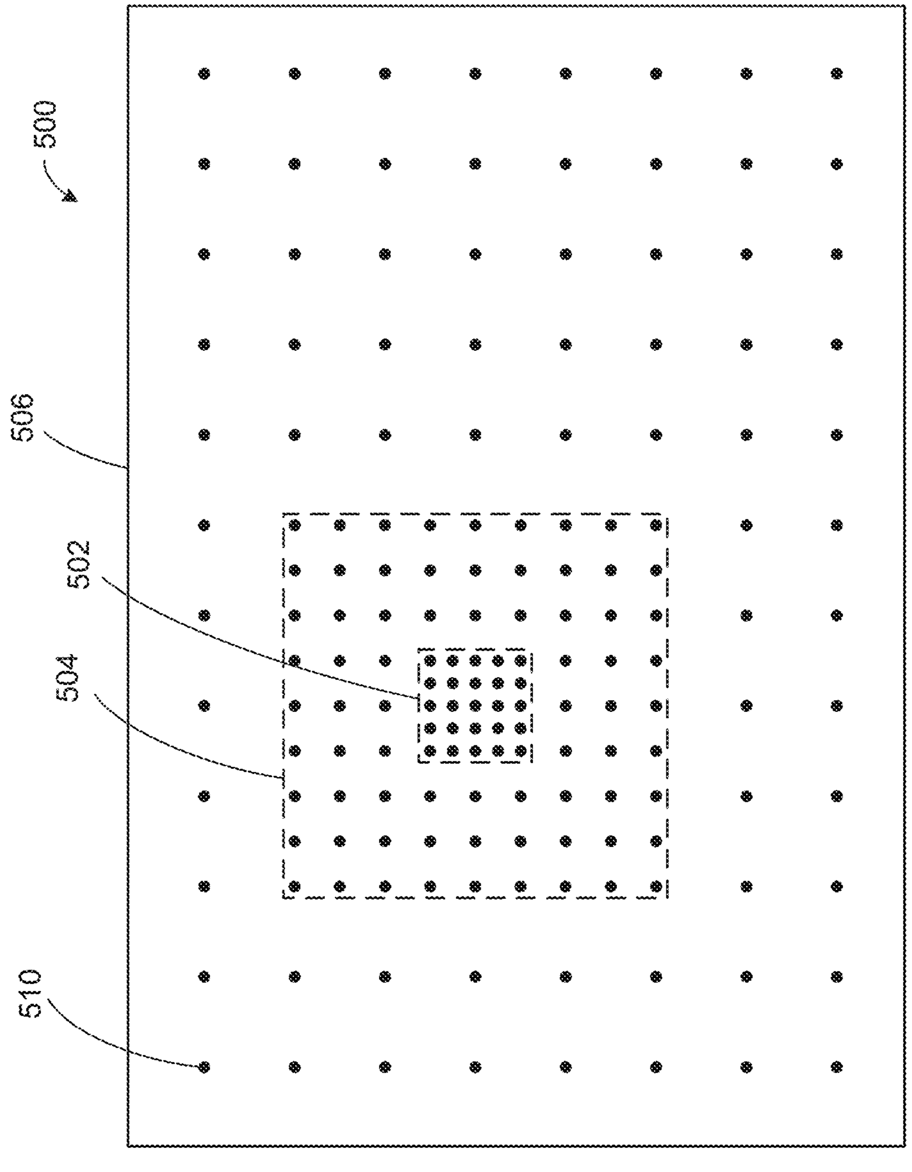
FIG. 5 illustrates an example activation map, according to various embodiments.

FIG. 5 illustrates an example activation map 500, according to various embodiments. As shown, the activation map 500 indicates a region 502 of densest sampling, a region 504 of less dense sampling, and a region 506 of least dense sampling. The region of 502 of densest sampling is a region corresponding to the eye gaze direction where the fovea of an eye is pointed. In some embodiments, the eye gaze direction can be included in the eye gaze data 402 or determined from the eye gaze data 402 using known techniques. Although described herein primarily with respect to the eye gaze data 402 and the eye tracking system 345, in some embodiments, the eye gaze direction can be determined in any technically feasible manner. For example, in some embodiments, the eye gaze direction can be predicted based on content in a scene, simulated based on one or more saliency maps, predicted based on previous eye gaze directions, and/or other otherwise determined.

The foveated sensing module 352 maps the eye gaze direction to the activation map 500 based on a calibration of the NED 300, described above in conjunction with FIG. 3. Then, the region 502 of densest sampling can be defined as a region surrounding the mapped eye gaze direction. The region 504 of less dense sampling is centered at a same point as, but has a larger area than, the region 502 of densest sampling. The region 506 of least dense sampling encompasses the entire activation map 500. Illustratively, the activation map 500 indicates, within each of the regions 502, 504, and 506, active pixels (e.g., pixel 510) for which sensor data is to be acquired and other pixels that are inactive and for which sensor data is not acquired. In the activation map 500, the region 502 is sampled twice as densely as the region 504, and the region 504 is sampled twice as densely as the region 506. Although the activation map 500 that includes three regions 502, 504, and 506 is shown for illustrative purposes, in some embodiments, an activation map can include any number of nested regions that are sampled at any suitable decreasing densities. Although sampling densities in the regions 502, 504, and 506 are encoded as active and inactive pixels in the activation map 500, sampling densities in regions of an activation map can be encoded in any technically feasible manner in some embodiments.

In some embodiments, the sizes of regions (e.g., regions 502, 504, and 506) and the relationships of those regions with respect to one another (e.g., the regions are nested and share a common center) are fixed. In such cases, only the locations of the regions within the activation map, such as the location of the center of nested regions that share a common center, are changed based on the eye gaze direction. In some embodiments, the sizes of regions are dynamic and can change based on a measure of error associated with the eye gaze direction. For example, in some embodiments, the measure of error can be a confidence with which the eye gaze direction is determined. The confidence can be output by the eye tracking system 345 or otherwise determined in any technically feasible manner. When the eye gaze direction is determined with low confidence, then the size of the densest sampling region (e.g., region 502) and optionally the other regions can be increased to account for the low confidence, and vice versa. As another example, in some embodiments, the measure of error can be a latency of the eye tracking system 345. When the latency of the eye tracking system 345 is greater, the size of the densest sampling region and optionally the other regions can be increased to account for the increased uncertainty (i.e., the lower confidence) of the tracked eye gaze direction, and vice versa.

Returning to FIG. 4, the sensors 406-1 to 406-N acquire sensor data 408-1 to 408-N (referred to herein collectively as sensor data 408 and individually as sensor data 408) based on the activation maps 404-1 to 404-N, respectively. Based on the eye gaze direction, a sensor data processing pipeline 410 sub-samples regions of the acquired sensor data 408 at multiple sub-sampling ratios, independently processes the sub-sampled data at the different sub-sampling ratios, and combines the results of the processing to generate processed data 412, as discussed in greater detail below in conjunction with FIGS. 6-8. The regions and ratios at which the sensor data 408 is sub-sampled are based on the eye gaze direction and can correspond to the regions of the activation maps 404. In some embodiments, independently processing the sub-sampled data at different sub-sampling ratios can include computing depth maps and/or warping sub-sampled images, discussed in greater detail below in conjunction with FIGS. 7-8. In some other embodiments, the independent processing can include any technically feasible processing, such as semantic segmentation, face detection, etc. Although primarily described herein with respect to sub-sampling as a reference example, in some embodiments, binning can be performed in lieu of sub-sampling. For example, a 2:1 sampling pattern could either be achieved by sampling 1 pixel out of each 2×2 pixel block or by averaging/summing signals from each pixel in the 2×2 block and combining the signals into a single, binned, value. Binning can be performed in either the analog or in the digital domain, and binning can prevent issues such as aliasing. In some embodiments, each sensor can be configured to operate in either a sub-sampling or a binning mode.

The sensor data processing pipeline 410 can be implemented in any technically software, hardware, or combination thereof in some embodiments. For example, in some embodiments, the sensor data processing pipeline 410 can be implemented on or near sensors of the NED 305. As another example, in some embodiments, the sensor data processing pipeline 410 can be implemented in one of the applications stored in the application 355 or in the engine 365, which run on the console 310. As a further example, in some embodiments, the sensor data processing pipeline 410 can be implemented in software running in a distributed or cloud computing system.

Although described herein primarily with respect to acquiring sensor data based on activation maps and a sensor data processing pipeline that sub-samples (or bins) and processes regions of the sensor data at multiple sub-sampling (or binning) ratios, the acquisition of sensor data based on activation maps and the sensor data processing pipeline can be implemented independently in some embodiments. For example, in some embodiments, sensor data that is acquired based on activation maps can be processed using a different processing pipeline than the sensor data processing pipeline. As another example, in some embodiments, sparse sensor data can be acquired without relying on activation maps and processed using the sensor data processing pipeline.

Figure 6:
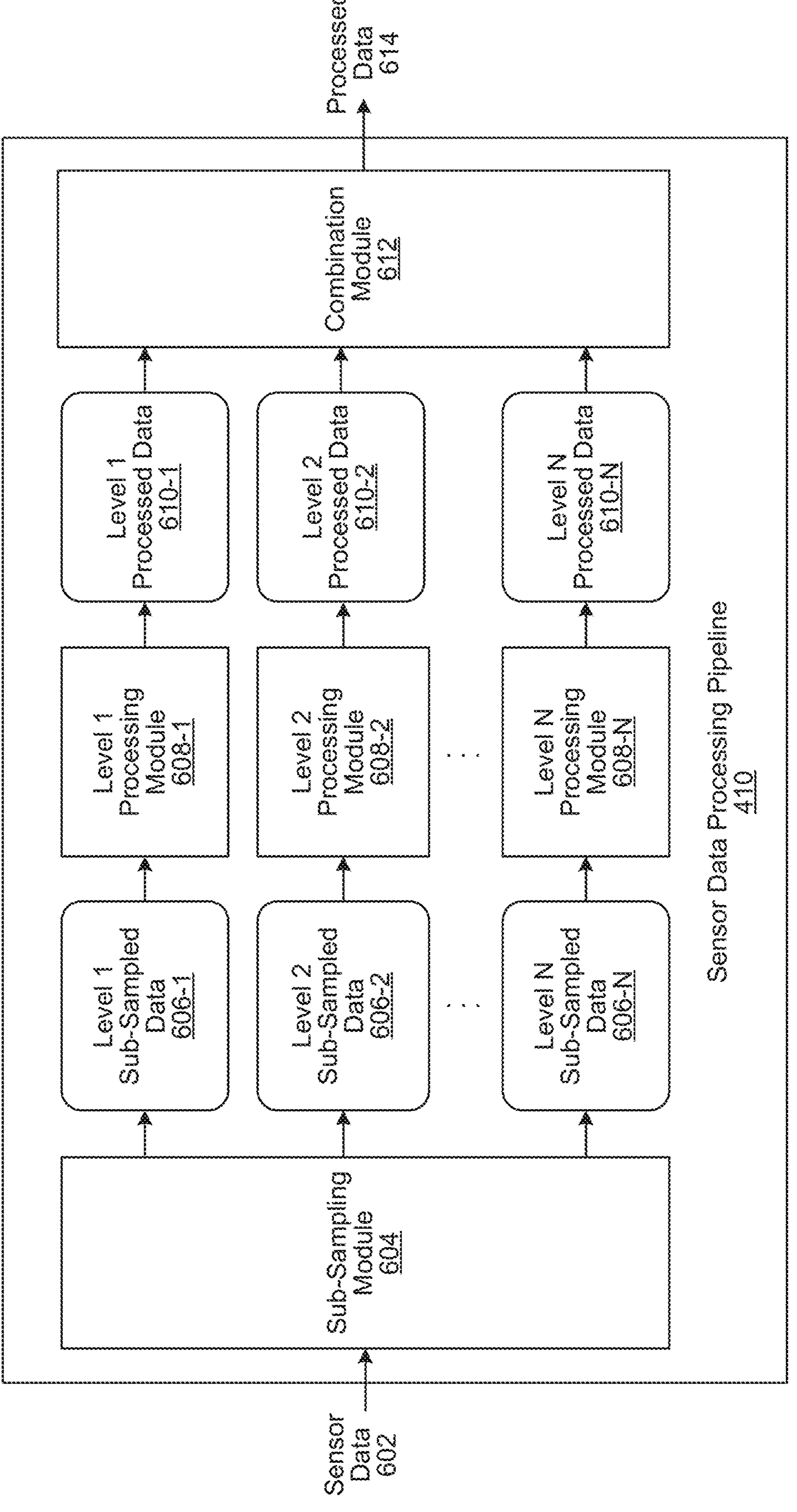
FIG. 6 illustrates the sensor data processing pipeline of FIG. 4 in greater detail, according to various embodiments.

FIG. 6 illustrates the sensor data processing pipeline 410 of FIG. 4 in greater detail, according to various embodiments. As shown, based on an eye gaze direction, a sub-sampling module 604 sub-samples pixel data for processing in regions of sensor data 602 (corresponding to sensor data 408 that is acquired by one of the sensors 406) at multiple sub-sampling levels to generate sub-sampled data 606-1 to 606-N (referred to herein collectively as sub-sampled data 606 and individually as sub-sampled data 606) at levels 1 to N, respectively. As described, binning can be performed in lieu of sub-sampling in some embodiments. In some embodiments, the regions that are sub-sampled correspond to regions of an activation map used to acquire the sensor data 602, and the sub-sampling ratios can correspond to (or be different from) sampling densities in regions of the activation map. Returning to the example activation map 500, described above in conjunction with FIG. 5, level 1 sub-sampled data 606-1 can be generated by sub-sampling sensor data 602 corresponding to the region 502 of the activation map 500 at one sub-sampling ratio; level 2 sub-sampled data 606-1 can be generated by sub-sampling, at a higher sub-sampling ratio, sensor data 602 corresponding to the region 504 and the region 502, and so forth for the other sub-sampling levels. In this example, the size of the region at each sub-sampling level is twice as large (i.e., has twice as wide a FOV) as the region of a previous sub-sampling level, and the region at each sub-sampling level is sub-sampled at twice the sub-sampling ratio of a previous sub-sampling level (e.g., 1:1 for level 1, 2:1 for level 2, etc.).

When the sensor data 602 includes images, the sub-sampling (or binning) of an image at multiple levels essentially treats each image as a combination of multiple overlaid images, each of which is associated with a different region of interest location within the image and sub-sampling ratio, and the region of interest locations depend on the eye gaze direction. Regions of interest that are further away from the eye gaze direction are sub-sampled with a higher sub-sampling ratio, because the fovea of an eye is not pointed towards those regions and a user is less likely to notice noise and artifacts in those regions. Advantageously, sub-sampling the sensor data 602 at multiple sub-sampling ratios and processing the same can be more computationally efficient than processing all of the sensor data at a uniformly high resolution.

The sub-sampled data 606-1 to 606-N at different levels are independently processed by processing modules 608-1 to 608-N (referred to herein collectively as processing modules 608 and individually as a processing module 608), respectively. Each processing module 608 can perform any technically feasible processing in some embodiments. For example, in a view synthesis application, each processing module 608 can compute a depth map and/or warp a sub-sampled image, as described in greater detail in conjunction with FIGS. 7-8. Other examples of processing by the modules 608 include semantic segmentation, face detection, etc. The processing modules 608 can execute in parallel in some embodiments. In other embodiments, the processing modules 608 do not execute in parallel.

In some embodiments, consistency is enforced across intermediate and/or final processed outputs of the processing modules 608 through training of machine learning models that are used in the processing modules 608 and/or the design of the sensor data processing pipeline 410. Such consistency is expected because regions of the subsampled data 606-1 to 606-N can be associated with the same real-world content. For example, when the processing modules 608 predict depths based on the subsampled data 606-1 to 606-N, the depths can correspond to the same object(s) in the real world and should, therefore, be consistent with each other. In some embodiments in which machine learning models are used by the processing modules 608 to process the sub-sampled data 608, the machine learning models can be trained using a loss function that penalizes differences between outputs of the machine learning models, thereby guaranteeing a level of consistency across the processing modules 608. In some embodiments, the sensor data processing pipeline 410 can include one or more modules that blend (e.g., average at least portions of) or otherwise process intermediate and/or final outputs of the processing modules 608 at different levels to make those outputs consistent with each other.

Processed data 610-1 to 610-N (referred to herein collectively as processed data 610 and individually as processed data 610) that is output by the processing modules 608-1 to 608-N, respectively, are combined by a combination module 612 to generate processed data 614. The combination module 612 can combine the processed data 610 in technically feasible manner in some embodiments, such as by up-sampling the previously sub-sampled data, blending the up-sampled data, or a combination thereof, etc.

Figure 7:
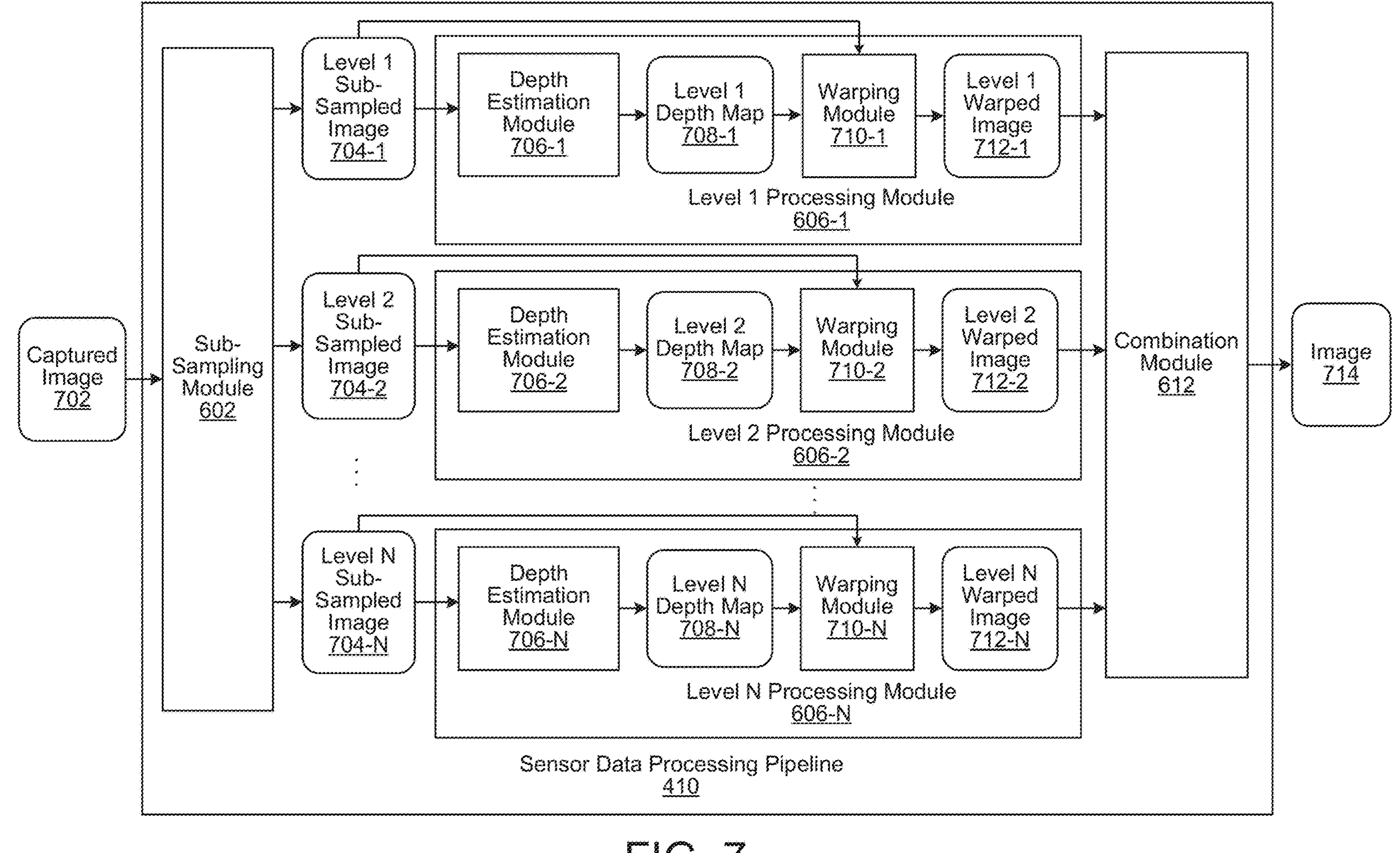
FIG. 7 illustrates an example sensor data processing pipeline for view synthesis, according to various embodiments.

FIG. 7 illustrates an example sensor data processing pipeline for view synthesis, according to various embodiments. View synthesis involves creating new views of real-world objects from a number of images taken from different points of view. View synthesis can be computationally intensive as well as latency and speed sensitive. The sensing and data processing techniques disclosed, which focus sensor and computational resources on regions corresponding to an eye gaze direction where a user is most likely to notice errors, can improve the computational efficiency of view synthesis applications.

As shown, in a view synthesis application, the sub-sampling module 604 sub-samples regions of captured image data 702 at multiple sub-sampling ratios to generate sub-sampled image data 704-1 to 704-N (referred to herein collectively as sub-sampled image data 704 and individually as sub-sampled image data 704) at levels 1 to N, respectively. Similar to the description above with respect to FIG. 6, the regions that are sub-sampled correspond to regions of an activation map used to acquire the image data 702, and the ratios at which the sub-sampling is performed can correspond to (or be different from) the sampling densities of regions of the activation map. In addition, binning can be performed in lieu of sub-sampling in some embodiments.

The sub-sampled image data 704-1 to 704-N at different levels are independently processed by processing modules 608-1 to 608-N, respectively. As shown, each processing module 608-1 to 608-N includes a corresponding depth estimation module 706-1 to 706-N (referred to herein collectively as depth estimation modules 706 and individually as a depth estimation module 706) and warping module 710-1 to 710-N (referred to herein collectively as warping modules 710 and individually as a warping module 710), respectively.

Each depth estimation module 706-1 to 706-N at a sub-sampling level generates a depth map 708-1 to 708-N (referred to herein collectively as depth maps 708 and individually as a depth map 708) for that level, respectively. A depth estimation module 706 can generate a depth map 708 in any technically feasible manner, such as by processing the corresponding sub-sampled image data 704 using a machine learning model, a semi-global matching (SGM) technique, and/or a combination thereof. In some embodiments, each depth estimation module 706 can employ the same technique (e.g., the same machine learning model or SGM technique) to generate a corresponding depth map 708. In some embodiments, one or more of depth estimation modules 706 can employ different techniques to generate depth maps. The different techniques can provide different levels of performance in terms of operations, memory requirements, etc. For example, the depth estimation module 706-1 at the lowest sub-sampling ratio level can use a machine learning model that is computationally expensive but highly accurate, whereas the depth estimation modules 706 at other sub-sampling levels can use less computationally expensive and less accurate depth estimation techniques, such as different (e.g., less complex) machine learning model(s) or the SGM technique. As another example, the depth estimation modules 706 can use machine learning models that are separately trained to process sub-sampled sensor data at the different sub-sampling levels.

Each warping module 710-1 to 710-N warps the corresponding sub-sampled image data 704 using the depth map 708-1 to 708-N that is computed by the corresponding depth estimation module 706-1 to 706-N to generate corresponding warped image data 712-1 to 712-N (referred to herein collectively as warped image data 712 and individually as warped image data 712). The warping transforms the sub-sampled image data 704 from the perspective of an imaging device that captured the image data 702 to the perspective of a user. The warped image data 712 generated by the warping modules 710 are then up-sampled, as appropriate based on the previous sub-sampling at the different levels of the warped image data 712, and the results are blended together by the combination module 612 to generate an output image 714 that can be displayed to a user via, e.g., the NED 300, either alone or combined with warped image data that is generated based on sensor data captured by other sensor devices. As an example of combining warped image data across multiple sensor devices, in the case of color pass-through, the output from a foveated monochrome sensor that provides luma information can be merged in YUV color space with the output from a foveated color sensor that provides chroma information.

In some embodiments, consistency between depth maps 708 that are generated by the depth estimation modules 706 is enforced through the training of machine learning models that are used to generate the depth maps 708 and/or by designing the sensor data processing pipeline 410 to include module(s) that blend the depth maps 708 generated by depth estimation modules 706 at different levels, similar to the discussion above in conjunction with FIG. 6. Inconsistencies between the depth maps 708 can cause discontinuities in objects that are displayed in a virtual scene. Enforcing consistency between the depth maps 708 can reduce or eliminate such discontinuities.

Figure 8:
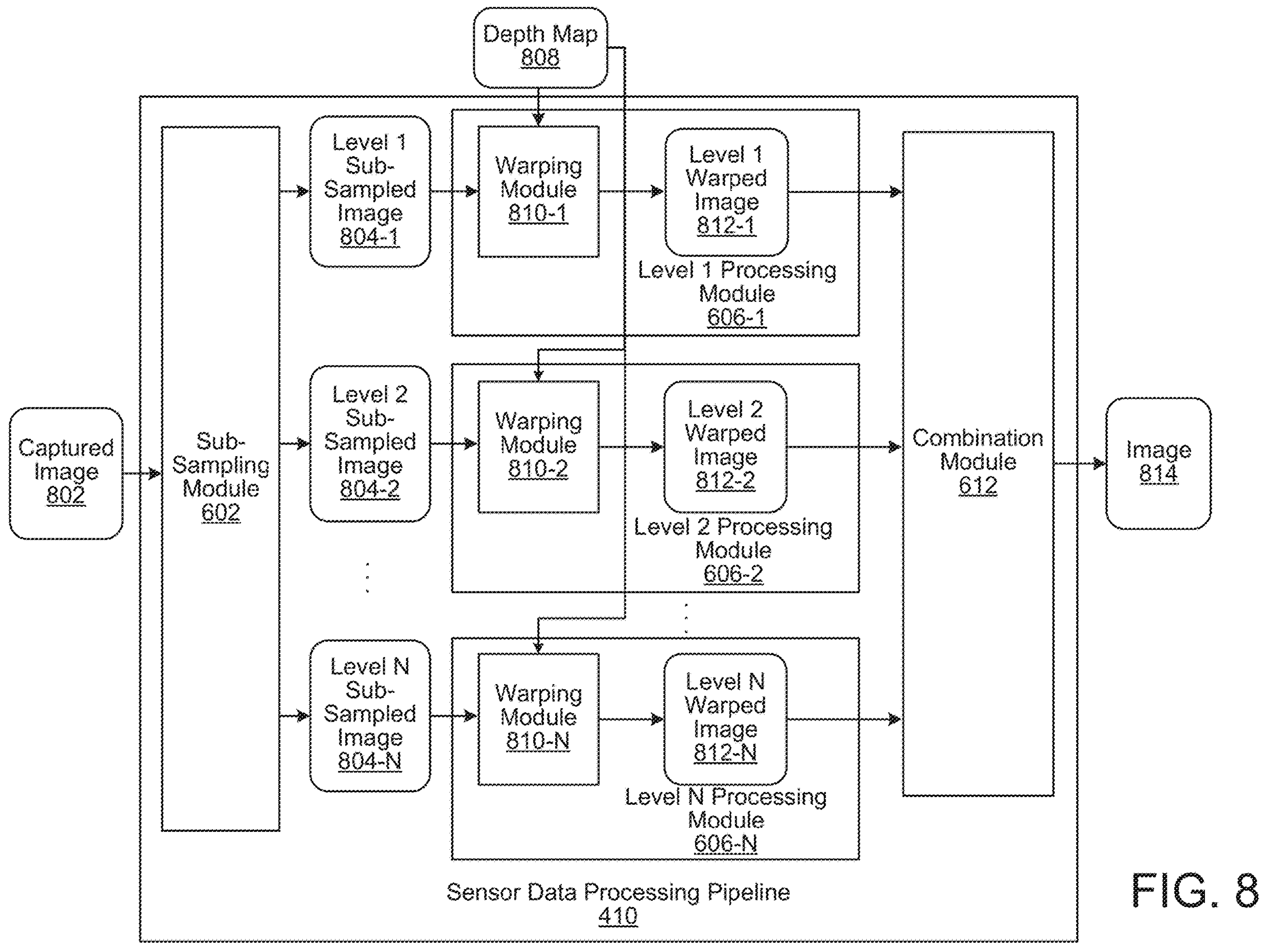
FIG. 8 illustrates an example sensor data processing pipeline for view synthesis, according to various other embodiments.

FIG. 8 illustrates an example sensor data processing pipeline for view synthesis, according to various other embodiments. Similar to the description above in conjunction with FIG. 7, the sub-sampling module 604 sub-samples, based on an eye gaze direction, regions of captured image data 802 at multiple sub-sampling ratios to generate sub-sampled image data 804-1 to 804-N (referred to herein collectively as sub-sampled image data 804 and individually as sub-sampled image data 804) at levels 1 to N, respectively. In addition, binning can be performed in lieu of sub-sampling in some embodiments.

Illustratively, the sub-sampled image data 804-1 to 804-N at different levels are independently processed by processing modules 608-1 to 608-N, respectively. As shown, each processing module 608-1 to 608-N includes a corresponding warping module 810-1 to 810-N (referred to herein collectively as warping modules 810 and individually as a warping module 810) that warps the sub-sampled image data 804-1 to 804-N based on a depth map 808 that is received as input, in order to generate warped images 812-1 to 812-N, respectively. The warping process is similar to the warping described above in conjunction with FIG. 7, except the depth map 808 is used rather than depth maps that are generated based on the sub-sampled image data 804. In some embodiments, the depth map 808 can be generated using sensor data that is acquired by another sensor, such as a depth sensor, a time-of-flight (ToF) sensor, or the like. For example, the depth map 808 could be a low-resolution depth map that is generated from depth data that is acquired by a low-resolution depth sensor. In some other embodiments, multiple depth maps can be generated based on sensor data captured by depth sensors. For example, a steerable depth illuminator or addressable vertical-cavity surface-emitting laser (VCSEL) array can be used to generate a high-resolution depth map for the region of a sub-sampling level that corresponds to an eye gaze direction, while passive depth sensors can be used to generate lower-resolution depth maps for other regions and sub-sampling levels. In some additional embodiments, depth sensor data is only used to generate a depth map for the region of a sub-sampling level that corresponds to an eye gaze direction.

The warped images 812 are then up-sampled, as appropriate based on the previous sub-sampling at the different levels of the warped images 812, and the results blended together by the combination module 612 to generate an output image 814 that can be displayed to a user (via, e.g., the NED 300), either alone or combined with warped image data that is generated based on image data captured by other imaging devices, similar to the description above in conjunction with FIG. 7.

Figure 9:
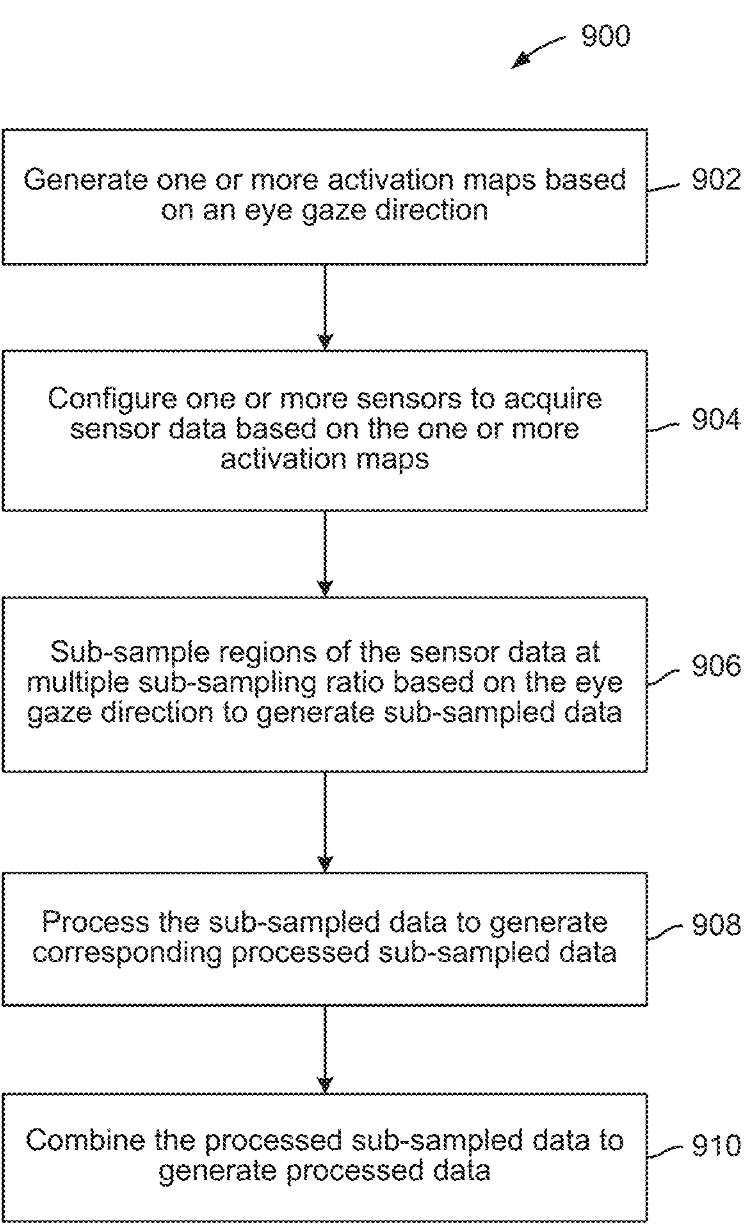
FIG. 9 is a flow diagram of method steps for acquiring and processing sensor data, according to various embodiments.

FIG. 9 is a flow diagram of method steps for acquiring and processing sensor data, according to various embodiments. Although the method steps are described with reference to the systems of FIGS. 1-8, persons skilled in the art will understand that any system may be configured to implement the method steps, in any order, in other embodiments.

As shown, a method 900 begins at step 902, where the foveated sensing module 352 generates one or more activation maps based on an eye gaze direction. As described, the eye gaze direction can be determined from eye gaze data and mapped to the one or more activation maps in order to determine regions around the mapped eye gaze direction where sensor data should be sampled densely. Each activation map also includes one or more other regions where sensor data is less densely sampled. The sizes of regions can be fixed or changed dynamically based on a measurement of error, as described above in conjunction with FIG. 5.

At step 904, the foveated sensing module 352 configures one or more sensors to acquire sensor data based on the one or more activation maps. Based on the activation map(s), less sensor data is digitized and less power is consumed relative to acquiring sensor data uniformly.

Subsequent to acquiring the sensor data, at step 906, the sensor data processing pipeline 410 sub-samples regions of the sensor data at multiple sub-sampling ratios based on the eye gaze direction to generate sub-sampled data. In some embodiments, the regions can correspond to regions of the activation map(s), and the sub-sampling ratios can correspond to sampling densities in different regions of the activation map(s). As described, in some embodiments, binning can be performed in lieu of sub-sampling.

At process 908, the sensor data processing pipeline 410 independently processes the sub-sampled data to generate corresponding processed sub-sampled data. Any technically feasible processing can be performed on the sub-subsampled data in some embodiments. For example, in a view synthesis application, the processing can include computing depth maps and/or warping sub-sampled images, as described above in conjunction with FIGS. 7-8. Other examples of processing that can be performed include semantic segmentation, face detection, etc.

At process 910, the sensor data processing pipeline 410 combines the processed sub-sampled data to generate processed data. Any technically feasible combination of the processed sub-sampled data can be performed in some embodiments, such as up-sampling, blending, or a combination thereof, etc.

One advantage of the disclosed techniques is that real-world content at locations that the eye gaze of a user is not focused can be captured at lower resolutions relative to real-world content at locations that the eye gaze is focused, which reduces the time required to digitize sensor data and the power consumption of sensor devices that acquire sensor data. In addition, a processing pipeline is disclosed that processes captured real-world content in a computationally efficient manner by reducing the number of pixels that are processed via sub-sampling (or binning) in regions corresponding to locations that the eye gaze is not focused. Among other things, the disclosed techniques permit applications that are speed, power, and/or latency sensitive to effectively capture and process real-world content. These technical advantages represent one or more technological advancements over prior art approaches.

1. In some embodiments, a computer-implemented method for acquiring sensor data comprises determining, based on first sensor data, an eye gaze direction associated with an eye viewing a scene, generating, based on the eye gaze direction, an activation map that includes a plurality of regions, wherein the activation map specifies, for each of the plurality of regions, a corresponding sampling density, and acquiring, via at least one sensor, second sensor data based on the sampling densities corresponding to the plurality of regions and specified by the activation map.

2. The method of clause 1, wherein the activation map comprises a first region that corresponds to the eye gaze direction, and a sampling density corresponding to the first region is higher than a sampling density corresponding to at least one other region of the activation map.

3. The method of clauses 1 or 2, wherein a size of the first region in the activation map is based on a measurement of error associated with the eye gaze direction.

4. The method of any of clauses 1-3, wherein the sampling density corresponding to a given region in the plurality of regions indicates pixels for which a portion of the second sensor data is acquired.

5. The method of any of clauses 1-4, further comprising sub-sampling or binning, based on the eye gaze direction, the second sensor data in a plurality of regions at a plurality of ratios to generate a plurality of sub-sampled or binned data, processing each sub-sampled or binned data included in the plurality of sub-sampled or binned data to generate corresponding intermediate processed data, and combining the intermediate processed data generated for each sub-sampled or binned data included in the plurality of sub-sampled or binned data to generate processed data for display to a user.

6. The method of any of clauses 1-5, wherein processing each sub-sampled or binned data included in the plurality of sub-sampled or binned data comprises warping the sub-sampled or binned data based on a depth map.

7. The method of any of clauses 1-6, wherein processing each sub-sampled or binned data included in the plurality of sub-sampled or binned data further comprises generating the depth map based on the sub-sampled or binned data.

8. The method of any of clauses 1-7, further comprising generating the depth map based on third sensor data that is acquired by at least one of a depth sensor or a time-of-flight sensor.

Break

9. The method of any of clauses 1-8, wherein combining the intermediate processed data comprises at least one of up-sampling or blending the intermediate processed data generated for each sub-sampled or binned data included in the plurality of sub-sampled or binned data.

10. The method of any of clauses 1-9, wherein the at least one sensor includes at least one of a monochrome image sensor, a color image sensor, a depth sensor, or a time-of-flight sensor.

11. In some embodiments, a computer-implemented method for processing sensor data comprises sub-sampling or binning, based on an eye gaze direction associated with an eye viewing a scene, first sensor data in a plurality of regions at a plurality of ratios to generate a plurality of sub-sampled or binned data, processing each sub-sampled or binned data included in the plurality of sub-sampled or binned data to generate corresponding intermediate processed data, and combining the intermediate processed data generated for each sub-sampled or binned data included in the plurality of sub-sampled or binned data to generate processed data for display to a user.

12. The method of clause 11, wherein processing each sub-sampled or binned data included in the plurality of sub-sampled or binned data comprises warping the sub-sampled or binned data based on a depth map.

13. The method of clauses 11 or 12, wherein processing each sub-sampled or binned data included in the plurality of sub-sampled or binned data further comprises generating the depth map based on the sub-sampled or binned data.

14. The method of any of clauses 11-13, wherein the depth map is generated using at least one of a trained machine learning model or a semi-global matching technique.

15. The method of any of clauses 11-14, further comprising generating the depth map based on second sensor data that is acquired by at least one of a depth sensor or a time-of-flight sensor.

16. The method of any of clauses 11-15, further comprising determining, based on second sensor data, the eye gaze direction, generating, based on the eye gaze direction, an activation map that includes a plurality of regions, wherein the activation map specifies, for each of the plurality of regions, a corresponding sampling density, and acquiring, via at least one sensor, the first sensor data based on the sampling densities corresponding to the plurality of regions and specified by the activation map.

17. The method of any of clauses 11-16, wherein the activation map comprises a first region that corresponds to the eye gaze direction, and a sampling density corresponding to the first region is higher than a sampling density corresponding to at least one other region of the activation map.

18. The method of any of clauses 11-17, wherein a size of the first region in the activation map is based on a measurement of error associated with the eye gaze direction.

19. In some embodiments, one or more non-transitory computer-readable storage media include instructions that, when executed by one or more processing units, cause the one or more processing units to perform steps for acquiring sensor data, the steps comprising determining, based on first sensor data, an eye gaze direction associated with an eye viewing a scene, generating, based on the eye gaze direction, an activation map that includes a plurality of regions, wherein the activation map specifies, for each of the plurality of regions, a corresponding sampling density, and acquiring, via at least one sensor, second sensor data based on the sampling densities corresponding to the plurality of regions and specified by the activation map.

20. The one or more computer-readable storage media of clause 19, wherein the instructions, when executed by the one or more processing units, further cause the one or more processing units to perform the steps of sub-sampling or binning, based on the eye gaze direction, the second sensor data in a plurality of regions at a plurality of ratios to generate a plurality of sub-sampled or binned data, processing each sub-sampled or binned data included in the plurality of sub-sampled or binned data to generate corresponding intermediate processed data, and combining the intermediate processed data generated for each sub-sampled or binned data included in the plurality of sub-sampled or binned data to generate processed data for display to a user.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations is apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed significantly concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A head-mounted device (HMD) comprising:
- an eye-tracking module configured to generate eye gaze data;
- a sensing module configured to:
  - generate one or more activation maps based on the eye gaze data; and
  - acquire sensor data based on the one or more activation maps.

2. The HMD of claim 1, wherein the one or more activation maps include regions having different sampling densities.

3. The HMD of claim 1, wherein generating the one or more activation maps based on the eye gaze data includes:
- generating a first activation map for a first sensor; and
- generating a second activation map for a second sensor.

4. The HMD of claim 3, wherein the first sensor has a field of view (FOV) different from the second sensor.

5. The HMD of claim 3, wherein the first sensor is an image sensor and the second sensor is a time-of-flight sensor.

6. The HMD of claim 1, wherein the one or more activation maps include a first region that corresponds to an eye gaze direction in the eye gaze data, and wherein a sampling density of the first region is higher than a sampling density corresponding to at least one other region of the one or more activation maps.

7. The HMD of claim 6, wherein a size of the first region in the one or more activation maps is based on a measurement of error associated with the eye gaze direction included in the eye gaze data.

8. The HMD of claim 1, wherein the sensor data is received from at least one of a monochrome image sensor, a color image sensor, a depth sensor, or a time-of-flight sensor.

9. A system comprising:
- an eye-tracking module configured to generate eye gaze data;
- a sensing module configured to:
  - generate one or more activation maps based on the eye gaze data; and
  - acquire sensor data based on the one or more activation maps.

10. The system of claim 9, wherein the one or more activation maps include regions having different sampling densities.

11. The system of claim 9, wherein generating the one or more activation maps based on the eye gaze data includes:
- generating a first activation map for a first sensor; and
- generating a second activation map for a second sensor.

12. The system of claim 11, wherein the first sensor has a field of view (FOV) different from the second sensor.

13. A computer-implemented method comprising:
- generating eye gaze data with an eye-tracking module;
- generating, with a sensing module, one or more activation maps based on the eye gaze data; and
- acquiring, with the sensing module, sensor data based on the one or more activation maps.

14. The computer-implemented method of claim 13, wherein the one or more activation maps include regions having different sampling densities.

15. The computer-implemented method of claim 13, wherein generating the one or more activation maps based on the eye gaze data includes:
- generating a first activation map for a first sensor; and
- generating a second activation map for a second sensor.

16. The computer-implemented method of claim 15, wherein the first sensor has a field of view (FOV) different from the second sensor.

17. The computer-implemented method of claim 13, wherein the sensing module is a foveated sensing module.

18. The computer-implemented method of claim 13, wherein the one or more activation maps include a first region that corresponds to an eye gaze direction in the eye gaze data, and wherein a sampling density of the first region is higher than a sampling density corresponding to at least one other region of the one or more activation maps.

19. The computer-implemented method of claim 18, wherein a size of the first region in the one or more activation maps is based on a measurement of error associated with the eye gaze direction included in the eye gaze data.

20. The computer-implemented method of claim 13, wherein the sensor data is received from at least one of a monochrome image sensor, a color image sensor, a depth sensor, or a time-of-flight sensor.

* * * * *